Dec. 26, 1922.
U. A. GARRED.
FURNACE FOR THE SMELTING OF ORES AND OTHER MATERIALS.
FILED JUNE 6, 1919.
1,439,957.
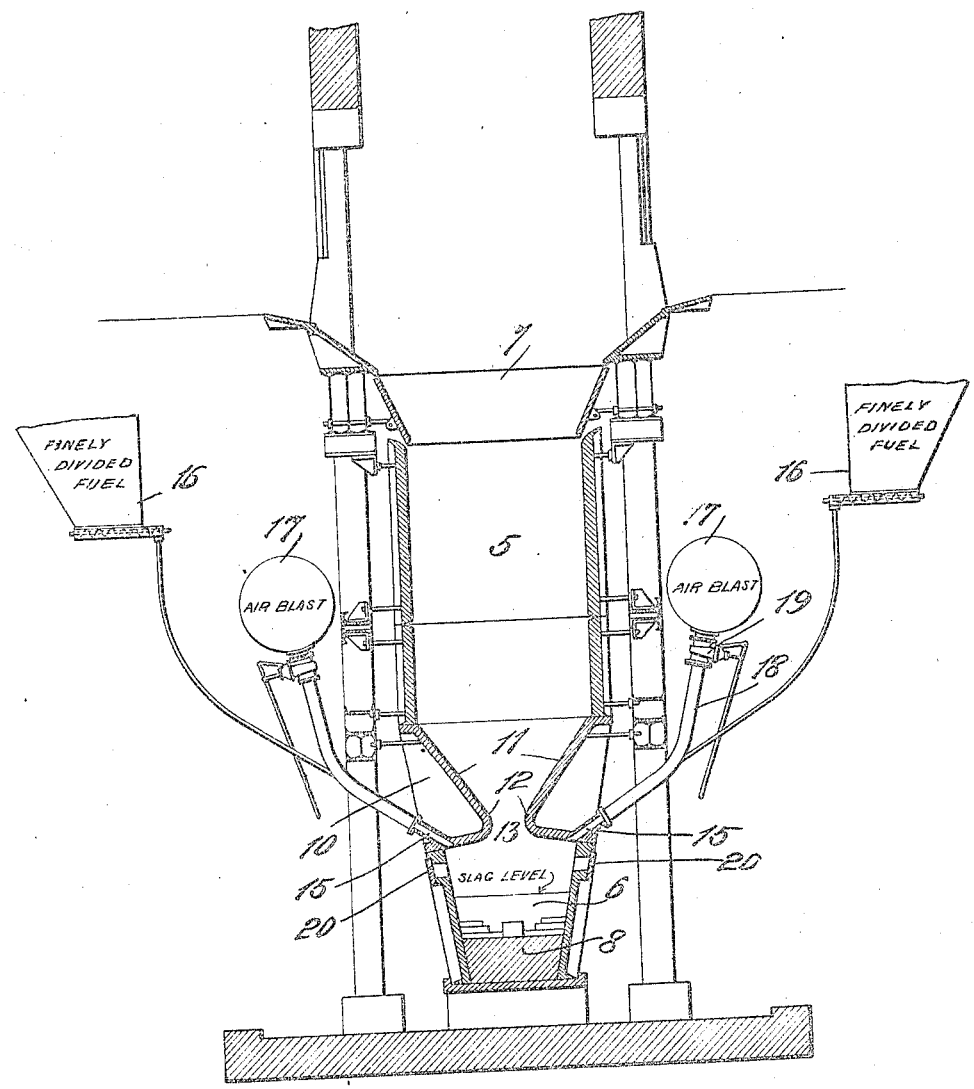
INVENTOR
Ulysses A. Garred
BY
Archibald Cox
ATTORNEY Patented Dec. 26, 1922.

1,439,957

UNITED STATES PATENT OFFICE.

ULYSSES A. GARRED, OF ELMHURST, NEW YORK, ASSIGNOR TO GARRED-CAVERS CORPORATION, OF NEW YORK, N. Y., A CORPORATION OF NEW YORK.

FURNACE FOR THE SMELTING OF ORES AND OTHER MATERIALS.

Application filed June 6, 1919. Serial No. 302,360.

*To all whom it may concern:*

Be it known that I, ULYSSES A. GARRED, a citizen of the United States, residing at Elmhurst, in the borough of Queens, in the county of Queens, in the city of New York and State of New York, have invented certain new and useful Improvements in Furnaces for the Smelting of Ores and Other Materials, set forth in the following specification.

The invention relates to improvements in furnaces for the smelting of ores and other materials, to secure many advantages in the direction of economy, efficiency and control. The operations of a furnace may be considered as comprising the development of heat from the combustion of fuel and the application of the heat to perform the work; and, in many instances, where the heat is directly applied by bringing the combustion and products thereof into direct contact with the material treated, the operation comprises control of the chemical character of the contacting gases, not only to develop heat, but also to secure such oxidizing, reducing, roasting or other effect on the material as may be desired. According to the present invention, the heat is developed by providing for exceptionally perfect combustion of fuel in a finely divided state, such as coal or other solid fuel in a pulverized state, or oil or other liquid fuel in an atomized state, particular provision being made for a combustion space, the maintenance of favorable conditions for combustion therein and control of the elements of combustion admitted thereto. Exceptionally advantageous application of the heat so developed is secured by so disposing the material that it automatically feeds itself to a fixed point of high heat or smelting zone immovably located in proper relation to the combustion. The provisions for the development and application of the heat, coupled with the control of the supplies of the elements of combustion, secure a regularity and perfection of operation heretofore not attained and permit of such accuracy of treatment of the material that such operations as separating metal from ore may be accomplished more cheaply and satisfactorily than heretofore.

It is an advantage of the invention and assists in its exposition to note that it may be practiced by removing only the lower section or sections of existing blast furnaces such as are now largely used and substituting therefor means for practicing the invention. Such means consist preferably of (1) a bottom or crucible retaining the molten material exposed to the combustion chamber thereabove, so that the molten material is maintained for a sufficient time at a sufficient temperature to facilitate the separation of the metal content from the slag, and, conversely, the heat of the molten material facilitates the combustion of the fuel and the melting operation, (2) a space within the crucible having a relatively small opening in its top to the charge thereabove and receiving at its relatively extended portions, where they will be out of contact with the charge, tuyeres connected with controllable supplies of finely divided fuel and air under pressure, so that the fuel may be effectively brought to a state of intense combustion and given any desired chemical character before contacting with the solid charge, and (3) a space thereabove and constituting a portion of the usual shaft of upright furnaces, provided with such a contraction at the bottom as will when the furnace is in operation prevent the solid charge from occupying the lower space and permit only the molten portion to pass through the comparatively small opening thereinto.

One of the difficulties in blast furnace operations has been irregularity of operation, particularly such as result from the change of the point of highest heat where the smelting or melting zone is located, and an important advantage of the present invention is the fixing of that point at or near the comparatively small opening or throat between the main portion of the shaft and the space where combustion is developed, so that it is always in fixed and proper relation with the combustion and with the charge. The regularity of operation secured by the practice of the present invention and means by which it is secured interact to secure sundry other objects and advantages, some of which will be referred to hereinafter.

In the accompanying drawing is illustrated a preferred form of furnace embodying the invention and adapted to its practice, the view being a vertical section. This furnace comprises a shaft 5, receiving the charge through the open top 7, as is usual.

The hearth 8 forms the bottom of the crucible 6 at the base of the shaft, which receives the molten material and retains it until it is drawn off. To a furnace having these and other usual features of blast furnace construction, the present invention is readily applied. To secure proper space for the development of combustion, the lower portion 10 of the shaft 5 is contracted so as to form inwardly projecting ledges 11, the inward extremities 12 of which form a relatively small or narrow discharge opening or throat 13, the inwardly projecting portions or ledges serving to support the solid portion of the charge, and the opening 13 permitting the molten material to pass down into the crucible 6. Where the furnace is round, the ledges 11 will be annular and the throat 13 a round hole. Where the furnace is of the preferred construction, namely, relatively long and narrow, the ledges 11 will project from the sides of the furnace toward the middle and the throat 13 will be a long, relatively narrow opening or slit. In any event, the ledges 11 will be adapted to support the greater part of the charge of the furnace in such manner that only the portion of the charge immediately above the throat, and consequently the portion contacting with the highest heat in the throat and so in molten condition, will pass down therethrough and, conversely, the heat will be so localized at and near the throat that that portion of the charge there will be constantly melted and the throat always open, with the result that the molten portion of the charge will regularly pass down through the throat into the crucible.

The tuyeres open into the space below the ledges, above the crucible and below the charge. The tuyeres 15 are shown in the drawing as located in the top of the space where combustion is developed, although they may conveniently be located in the side walls thereof. The tuyeres are so located that they are always free and unobstructed, and no portion of the charge can be hardened by the chill of the air forced through them so as to interfere with operation.

The portion of the furnace comprising the ledges and space therebelow into which the tuyeres enter is preferably constructed so that it may be removed for repairs or renovation without disturbing the remainder of the furnace, and this construction is of advantage in reducing operating costs.

The fuel, whether pulverized or atomized, is conducted into the furnace below the charge through the tuyeres from reservoirs 16. The air under pressure is conducted from the bustle pipes 17 down through the pipes 18 controlled by the valves 19 into the tuyeres, and this controllable air blast is availed of to introduce the fuel into the furnace and to produce therein such reducing, oxidizing, roasting or other conditions as may be desired for the treatment of the particular ore or material.

The combustion is developed in the space below the charge and extends more or less up through the throat 13 and in contact with the portion of the charge there and thereabove. A plurality of tuyeres disposed in pairs opposite each other are preferably employed so as to facilitate and increase the maintenance of a high temperature in the throat and immediately thereabove. The maintenance of a high temperature at this point localizes and fixes the melting zone there, prevents the solidifying of the charge there and insures regularity of operation. The fact that the fuel is conveyed into the furnace and combustion developed above the mass of molten material in the crucible makes combustion more perfect and, conversely, keeps the molten material at a sufficient temperature for a sufficient time to facilitate the separation of the slag from the metal content.

This construction of furnace makes it possible to secure exceptional control and regulation of operation; and further to facilitate this, apertures 20 are formed in the walls of the crucible above the level of the molten material therein to enable the operator to observe the conditions and regulate the amounts and proportions of air and fuel to secure any desired condition.

There are many other advantages resulting from the practice of the invention. For example, flotation concentrates, flue dust, and the like, which have heretofore been difficult to smelt, can be treated economically and effectively in a furnace of the present construction, by introducing them into the space where combustion is developed along with the air and finely divided fuel, or otherwise, since the temperature and draft conditions therein effectively reduce them to molten condition, so that they become part of the molten mass in the crucible.

It will be understood that the size of the throat or opening 13 will depend somewhat upon the nature of the charge, the preferred size being such that only the melted material will pass down therethrough when the furnace is in operation. In some instances, it is desirable in starting the furnace to arrange a temporary bridge to prevent the material falling through the throat 13, until heat conditions are developed which insure the reduction of such material to molten condition, but in other instances, particularly where the charge is composed of easily melted material or the space below the ledges or the space of the throat to start is large, this bridging of the throat to start the furnace is unnecessary. The invention contemplates that in treating some ores, some coke or other form of carbon or fuel may be introduced with the charge or otherwise, that the ledges 11 may be of sundry shapes and of sundry materials protected against over-heating in known ways, and that other details will be adjusted as the particular material and circumstances indicate, without departing from the spirit or scope of the invention as set forth in the following claims.

I claim—

1. A blast furnace comprising a shaft, a crucible at the bottom of the shaft for containing the molten material, means including tuyeres for feeding finely divided fuel into the upper part of the crucible, inwardly projecting ledges above the crucible separated by a narrow throat for sustaining substantially the whole of the charge, the space between the molten material and the ledges serving as a combustion zone whereby the molten material assists in the combustion and the combustion keeps the molten material hot to facilitate the separation of the metal from the slag.

2. A furnace comprising a shaft, a crucible at the bottom of the shaft for containing the molten material, inwardly projecting ledges above the crucible separated by a narrow throat for sustaining substantially the whole of the charge, tuyeres entering the crucible below the ledges and controllable means for introducing finely divided fuel into the crucible, the space betwen the ledges and the molten material serving as a combustion zone whereby the melting or smelting zone is kept at substantially the throat and in fixed relation with the combustion zone.

3. A furnace comprising a shaft, a crucible at the bottom of the shaft for containing the molten material, inwardly projecting ledges above the crucible separated by relatively narrow opening, tuyeres entering the crucible between the ledges and the level of the molten material, the space defined by the ledges and the level of the molten material serving as a combustion zone, and controllable means for introducing finely divided fuel into the combustion zone whereby the combustion keeps the molten material hot to facilitate the separation of the metal from the slag and the heat of the molten material assists in the combustion.

ULYSSES A. GARRED.